US008510281B2

(12) United States Patent
Schwarzmann

(10) Patent No.: US 8,510,281 B2
(45) Date of Patent: Aug. 13, 2013

(54) ULTIMATE LOCKING MECHANISM

(75) Inventor: Winfried Schwarzmann, Waghausel (DE)

(73) Assignee: SAP AG, Walldorf (DE)

( * ) Notice: Subject to any disclaimer, the term of this patent is extended or adjusted under 35 U.S.C. 154(b) by 838 days.

(21) Appl. No.: 12/338,975

(22) Filed: Dec. 18, 2008

(65) Prior Publication Data

US 2010/0161571 A1    Jun. 24, 2010

(51) Int. Cl.
*G06F 7/00* (2006.01)
*G06F 17/00* (2006.01)

(52) U.S. Cl.
USPC .......................................................... 707/704

(58) Field of Classification Search
USPC .......................................................... 707/704
See application file for complete search history.

(56) References Cited

U.S. PATENT DOCUMENTS

| | | | | |
|---|---|---|---|---|
| 5,715,447 | A * | 2/1998 | Hayashi et al. ........................ | 1/1 |
| 6,026,424 | A * | 2/2000 | Circenis ........................ | 718/104 |
| 6,374,285 | B1 * | 4/2002 | Scales et al. ................ | 718/104 |
| 6,591,272 | B1 * | 7/2003 | Williams .............................. | 1/1 |
| 7,212,876 | B2 * | 5/2007 | Blumenfeld et al. ........... | 700/99 |
| 7,305,582 | B1 * | 12/2007 | Moser et al. ..................... | 714/13 |
| 7,406,476 | B1 * | 7/2008 | Galloway et al. ...................... | 1/1 |
| 7,526,637 | B2 * | 4/2009 | Jung et al. ..................... | 712/241 |
| 7,552,121 | B2 * | 6/2009 | Barsness et al. ...................... | 1/1 |
| 7,734,604 | B1 * | 6/2010 | Sinclair et al. ................ | 707/704 |
| 7,765,536 | B2 * | 7/2010 | Gordy et al. ................... | 717/161 |
| 7,805,463 | B2 * | 9/2010 | Bevan et al. ................... | 707/803 |
| 2003/0135495 | A1 * | 7/2003 | Vagnozzi ........................... | 707/3 |
| 2004/0019639 | A1 * | 1/2004 | E et al. .......................... | 709/205 |
| 2004/0220913 | A1 * | 11/2004 | Walker ............................... | 707/3 |
| 2004/0220933 | A1 * | 11/2004 | Walker ............................... | 707/8 |
| 2004/0260852 | A1 * | 12/2004 | Olstad et al. .................. | 710/200 |
| 2005/0034014 | A1 * | 2/2005 | Moser et al. ..................... | 714/17 |
| 2006/0052898 | A1 * | 3/2006 | Blumenfeld et al. .......... | 700/108 |

(Continued)

FOREIGN PATENT DOCUMENTS

| | | | |
|---|---|---|---|
| EP | 551528 A1 | * | 7/1993 |
| JP | 05088954 A | * | 4/1993 |
| JP | 2009251871 A | * | 10/2009 |

OTHER PUBLICATIONS

Yannis Smaragdakis, Anthony Kay, Reimer Behrends, and Michal Young. General and efficient locking without blocking. In MSPC '08: Proc. 2008 ACM SIGPLAN workshop on Memory Systems Performance and Correctness, pp. 1-5, Mar. 2008.*

*Primary Examiner* — Jacob F Bétit
*Assistant Examiner* — Griselle Corbo
(74) *Attorney, Agent, or Firm* — Blakely, Sokoloff, Taylor & Zafman, LLP

(57) ABSTRACT

A system and method for an ultimate locking mechanism which minimizes a lock period for modifying shared data in a shared database. A process is executed as one or more initial instances and a final instance. Each initial instance reads the shared data from the shared database without acquiring a lock on the shared database. The locking mechanism obtains results that are directed to modifying the shared data and buffers the results at least partially. During or after each of the initial instances, it determines whether the next instance is to be the final one (e.g., the estimated runtime of the next instance is acceptable as the lock period). In response to a positive determination, the final instance of the process is executed. The final instance uses at least one of the buffered results during execution and acquires the lock on the shared database to modify the shared data.

20 Claims, 5 Drawing Sheets

(56) References Cited

U.S. PATENT DOCUMENTS

| | | | |
|---|---|---|---|
| 2006/0277551 A1* | 12/2006 | Accapadi et al. | 718/107 |
| 2007/0006186 A1* | 1/2007 | Johnson et al. | 717/140 |
| 2007/0050429 A1* | 3/2007 | Goldring et al. | 707/203 |
| 2007/0094652 A1* | 4/2007 | Chia et al. | 717/151 |
| 2007/0282839 A1* | 12/2007 | Walker | 707/8 |
| 2007/0282966 A1* | 12/2007 | Walker | 709/213 |
| 2007/0283357 A1* | 12/2007 | Jeter et al. | 718/102 |
| 2008/0097997 A1* | 4/2008 | White et al. | 707/8 |
| 2009/0007120 A1* | 1/2009 | Fenger et al. | 718/102 |
| 2009/0007127 A1* | 1/2009 | Roberts et al. | 718/104 |
| 2009/0037366 A1* | 2/2009 | Shankar et al. | 707/2 |
| 2009/0037498 A1* | 2/2009 | Mukherjee et al. | 707/205 |
| 2009/0254774 A1* | 10/2009 | Chamdani et al. | 714/2 |
| 2010/0005457 A1* | 1/2010 | Komatsu et al. | 717/145 |
| 2010/0011360 A1* | 1/2010 | Fontenot et al. | 718/100 |
| 2010/0023631 A1* | 1/2010 | Archer et al. | 709/230 |

\* cited by examiner

ULTIMATE LOCKING MECHANISM

FIELD OF THE INVENTION

The present invention relates generally to database management. More particularly, this invention relates to the use of a locking mechanism for enhancing the efficiency of shared data maintenance in a multi-user environment.

BACKGROUND

A multi-user system generally uses a locking mechanism to protect the integrity of shared data. For example, if a user wants to change one or more data sets in a shared database, the user has to request locks for these data sets before he can change the content of the data sets. The locks on the data sets can be exclusive. That is, after the user obtains the locks from the system, no other user can modify these data sets and all other lock requests for any of these data sets will be rejected by the system. Another user may obtain locks on the data sets once the user releases the locks. This conventional locking procedure is sufficient if locks are kept by a process for only short periods of time, or if there is a low likelihood of two users modifying the same data sets at the same time.

However, the conventional locking procedure can be insufficient for many business processes. For example, some processes read data from multiple data sets. Many of these data sets can potentially be, but only a few actually are, changed as a result of the processes. As another example, some processes perform data manipulation for a long time as a result of intensive computations or strong dependency on the decisions of an online user. If there are other time-critical processes running at the same time that need to modify the same data sets, the long-term locks on the data sets will result in unacceptably long downtimes for those time-critical processes.

However, if no locking mechanism is used, a process will have to determine, before saving its results, whether the underlying data sets have been modified during the runtime of the process. This determination can be difficult and time-consuming. Additionally, if the process determines that modifications have occurred during the runtime, the process may be forced to partly or completely discard its results which are rendered invalid due to the modifications. Discarding the results can be unacceptable if the results were compiled with the input of a user. Thus, there is a need for a locking mechanism that improves the drawbacks of the conventional locking procedure.

BRIEF DESCRIPTION OF THE DRAWINGS

Embodiments are illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

DETAILED DESCRIPTION

Figure 1:
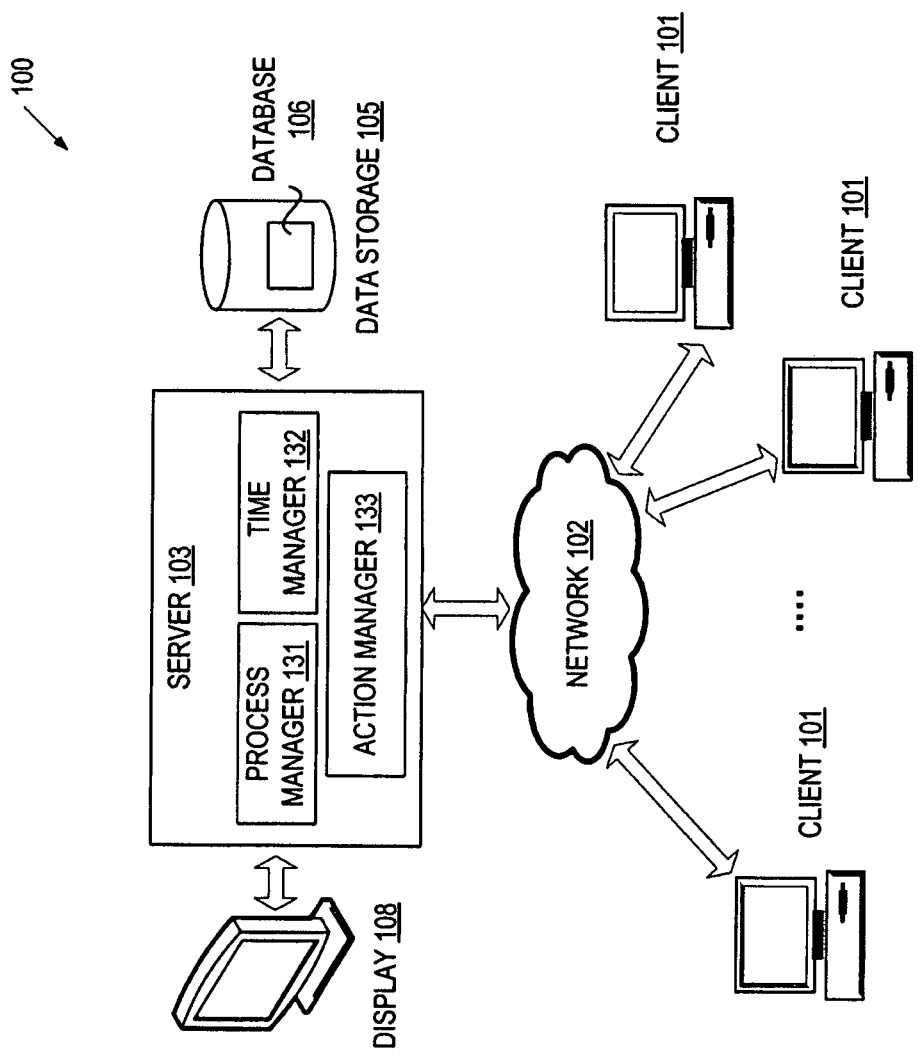
FIG. 1 illustrates a network architecture in which embodiments of the present invention may be implemented.

A method and system for an ultimate locking mechanism is described herein. The locking mechanism aims at minimizing a lock period for modifying shared data in a shared database. In one embodiment, a process is executed as one or more initial (process) instances and a final instance. Each initial process instance reads the shared data from the shared database without acquiring any lock on the shared database. The locking mechanism obtains results that are directed to modifying the shared data and buffers the results at least partially. During or after each initial instance, the locking mechanism determines whether the next instance is to be final. This determination could include, as a first step, an estimation of the runtime of the next instance. And, as a second step, either a decision whether this runtime is acceptable as the lock period or a comparison with a possibly given overall runtime for the whole process. In either case, if the final instance of the process is executed, then it uses at least one of the buffered results during execution and acquires at least one lock on the shared database to modify the shared data.

The ultimate locking mechanism described herein uses an iterative method which executes a process as multiple process instances (also referred to as "instances"). Each instance is a logical unit of work. The process is directed to modifying shared data in a shared database (also referred to as "master data"). All of the instances, excluding the final instance, do not acquire locks on the database when reading data from the database. The final instance is the only instance of the process that requests the actually necessary locks to the data sets in the database. All of the instances build a state of the shared data when reading the shared data from the shared database. The instances repeatedly update the state of the shared data. In detail, the instances obtain results from a user interface and one or more functions, build actions of one or more formats based on these results and apply these actions to update the state repeatedly. In addition, the instances store at least some of the formatted actions in a shared buffer (also referred to as "action buffer"). Alternatively, the instances update the state repeatedly by retrieving actions from the action buffer; the actions have been built by preceding instances. This way, the action buffer is accessed by all of the instances including the final instance. As a result, with the help of the actions produced by the preceding instances, the final instance is able to perform the necessary shared data modifications quickly (e.g. without, or with a minimum of, further user interactions or functional calls). Therefore, with this ultimate locking mechanism, a user can perform decision, computation and/or data intensive tasks without blocking other users from accessing the same data for a long period of time.

The locking mechanism described herein can be optimized by distinguishing between the fixed portion ("fixed state") and the variable portion ("variable state") of the master data accessed by the process. The process reads the fixed state only once before the first process instance and reads the current variable state at the beginning of each process instance. At the beginning of each process instance, the fixed and variable states are merged. Further, each process instance records, in a shared buffer, at least those state manipulations ("actions") which were compiled with the help of a user or which consumed considerable system resources (e.g. runtime, memory). If possible, the recorded actions are applied to the state of the current process instance to minimize its runtime.

In general, a succeeding instance takes less time to complete than the preceding instances since the fast retrieval and application of actions renders the often time-consuming obtainment of the corresponding results unnecessary. However, if other processes modify many of the data sets between the start of the preceding instance and the start of the succeeding instance, then the state of the succeeding instance may significantly differ from the state of the preceding instance. As a possible consequence, only a few of the actions stored by the preceding instances can be applied to the state of the succeeding instance. In addition, the largely different state of the succeeding instance may require the obtainment of many new results, and some may be very time-intensive. Therefore, as a rule of thumb, the more the states of the process instances are alike, the less instances are to be executed and the shorter the lock period of the final instance.

FIG. 1 shows an embodiment of a network environment in which a system 100 may operate. System 100 includes a plurality of clients 101 and a server 103 coupled by a network 102, which may be a public network (e.g., the Internet) or a private network (e.g., an Ethernet or a Local Area Network (LAN)). Clients 101 may be, for example, personal computers (PCs), workstations, mobile phones, palm-sized computing devices, personal digital assistants (PDAs), remote servers, or the like.

In one embodiment, server 103 is locally coupled to data storage 105 in which a database 106 is stored. Data storage 105 may include one or more database systems. Data storage 105 may include one or more storage devices (e.g., read only memory ("ROM"), random access memory ("RAM"), magnetic disk storage media, optical storage media, flash memory devices, etc.), that are local and/or remote from computing device 103. In one embodiment, database 106 stores multiple data sets that can be used by business processes, e.g., product lifecycle management, inventory management, etc. Server 103 can retrieve the data in the data sets and present the data to a user via a user interface on a display 108 or the display of any client 101.

According to one embodiment of the present invention, database 106 can be accessed by multiple users and multiple processes. Each user can start one or more processes that run on client 101 or server 103. The processes may need to read from and write into database 106 during runtime. To ensure the integrity of data in database 106, server 103 provides a lock to each data set in database 106. When a process obtains a lock on a data set, it becomes the lock owner of the data set. Only the lock owner process can write into the data set. The lock owner process releases the lock when it finishes writing to the data set.

In the embodiment of FIG. 1, server 103 includes a process manager 131, a time manager 132 and an action manager 133. Process manager 131 manages the processes and their associated instances that need access to database 106. Some or all of the processes may have a long runtime. Process manager 131 executes a process as a sequence of instances over a time period; only the final instance acquires locks on the necessary data sets in database 106. Time manager 132 estimates the runtime of a next instance and determines whether the next instance started by the process manager 131 shall be the final instance. Action manager 133 manages the storage and retrieval of actions produced by each instance. The functionality of process manager 131, time manager 132 and action manager 133 will be described in greater detail with reference to FIGS. 2-5.

Figure 2:
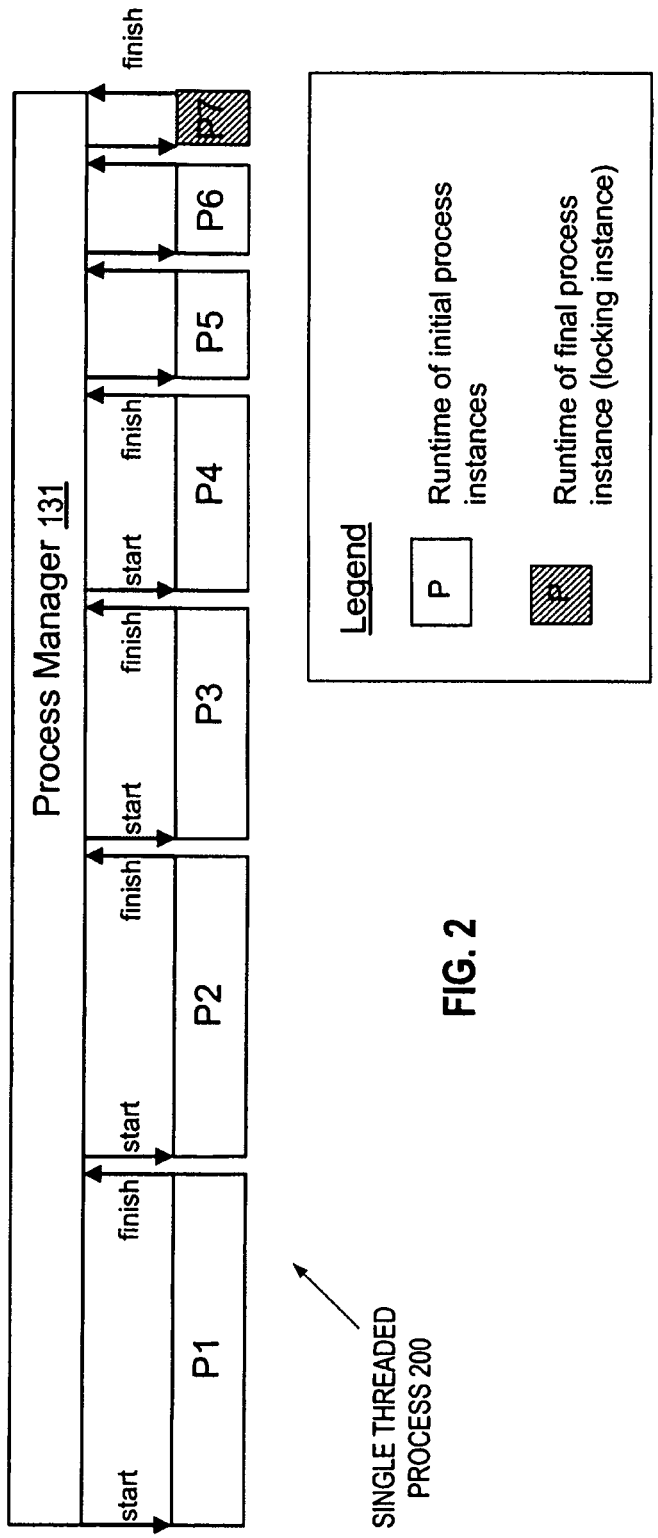
FIG. 2 illustrates one embodiment of a single-threaded process that includes a sequence of non-overlapping process instances.

FIG. 2 illustrates one embodiment of a single-threaded process 200 that iterates over process instances P1, P2, ..., P7. Process instances P1, P2, ..., P7 form a non-overlapping sequence. Process manager 131 controls the start of each instance P1, P2, ..., P7. Each instance P2, P3, ..., P7 starts after the preceding instance finishes. In general, a succeeding instance takes less time to complete than the preceding instances. Each of the process instances P1, P2, ..., P6 reads master data and obtains results for manipulating it internally in preparation for final instance P7, which actually modifies the master data in the database. Final instance P7 is the only instance of process 200 that acquires the necessary locks on the data sets of the master data. Due to the preparation work performed by the preceding instances (P1, P2, ... P6), final instance P7 is able to quickly modify the master data without locking up the data sets of the master data for an extensive period of time. In some embodiments, final instance P7 may be executed without, or with a minimum of, further computations or user interactions.

Figure 3:
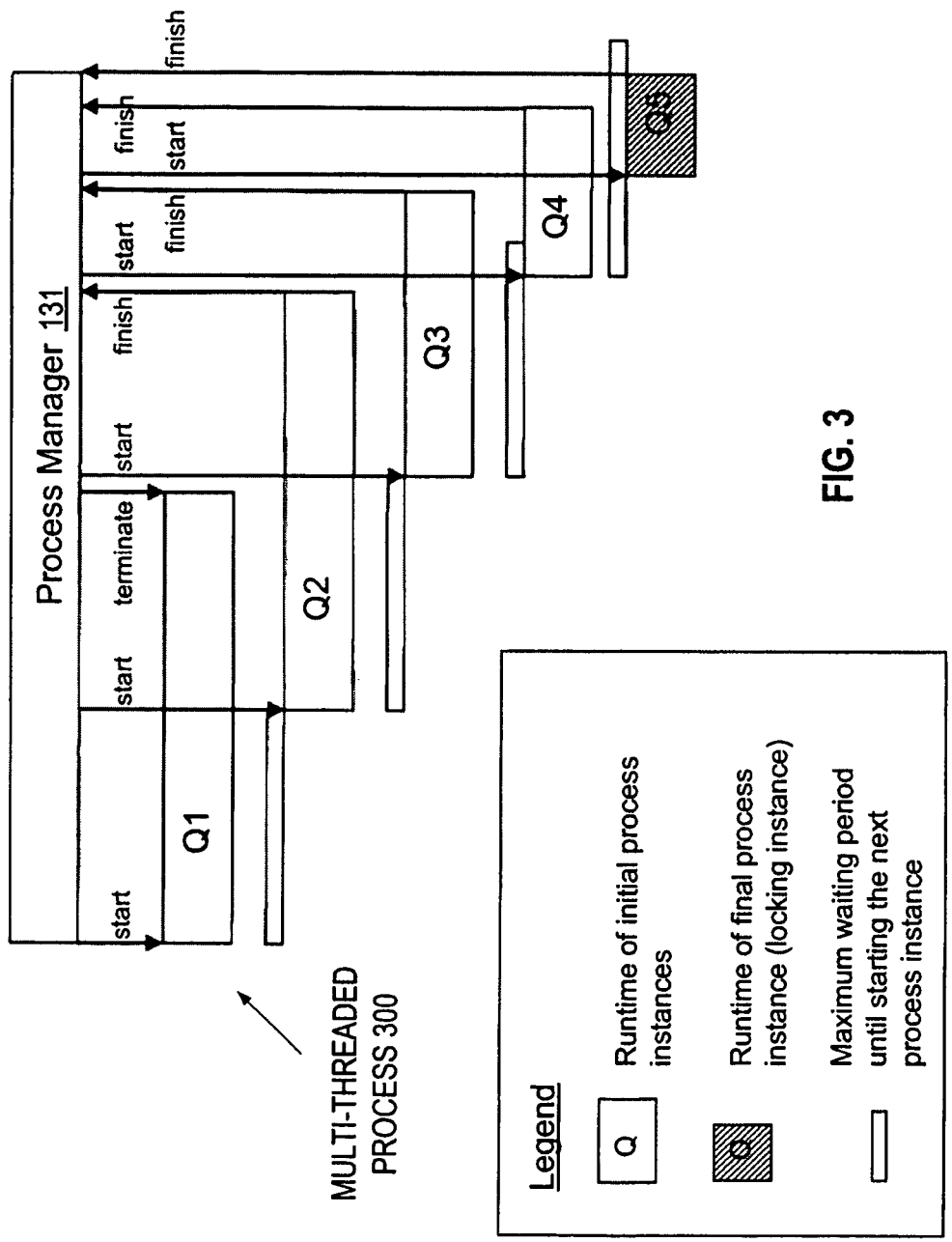
FIG. 3 illustrates one embodiment of a multi-threaded process that includes concurrent process instances.

FIG. 3 illustrates an embodiment of a multi-threaded process 300 that iterates over process instances Q1, Q2, ..., Q5. Process instances Q1, Q2, ..., Q5 form a cascadingly overlapping sequence in which the process instances are executed, at least partially, in parallel. Process manager 131 controls the start and the finish of each instance Q1, Q2, ..., Q5. In some scenarios, process manager 131 may decide to terminate a preceding process instance (e.g., Q1) when the current process instance (e.g., Q2) has progressed to a point that it can no longer take advantage of results from the preceding process instance. In other scenarios, process manager 131 may allow a preceding process instance (e.g., Q2, ..., Q5) to run concurrently with the current process instance until the preceding process instance runs to a predefined finish. In process 300, each instance starts before the preceding instance finishes, and takes less time to complete than the preceding instance. Each of the process instances Q1, Q2, ..., Q4 reads master data and obtains results for manipulating it internally in preparation for final instance Q5, which actually modifies the master data in the database. Final instance Q5 is the only instance of process 300 that acquires the necessary locks on the data sets of the master data. Due to the preparation work performed by the preceding instances (Q1, Q2, ..., Q4), final instance Q5 is able to quickly modify the master data without locking up the data sets of the master data for an extensive period of time. In some embodiments, final instance Q5 may be executed without, or with a minimum of, further computations or user interactions.

In the embodiments of FIGS. 2 and 3, process manager 131 starts each instance. Process manager 131 may start the final instance based on a determination made by time manager 132. For real-time applications this determination can depend on the remaining available time and the expected runtime of the next process instance. The expected runtime of the final process instance should be less than the runtime of each of its preceding process instances. Each of the instances accomplishes at least partly the work of its succeeding instances. Thus, the succeeding instances can run faster and faster, and the final instance will have the shortest runtime among all instances of the process.

However, in some scenarios, the process instances may not be able to utilize much of the work performed by the preceding instances. In these scenarios, the iteration of the process instances, as described above, will terminate and a fallback method will be used. The fallback method creates and executes a final process instance with a full-blown locking mechanism (as it is in the state-of-the-art). To facilitate the acquisition for all necessary locks for the fallback method, the process may place reservations for those data sets which are still locked by other processes, or may delay the start of the final process instance to a low-load system period (e.g., at night or on the weekend).

Embodiments of the system and method for implementing process 200 and process 300 will be described below with reference to FIGS. 4 and 5. Before describing further details of the embodiments, an example of a process that uses the aforementioned ultimate locking mechanism is provided. The example is simplified for the purpose of illustrating the principles of the ultimate locking mechanism. It is understood that the same principles can be applied to other business processes, such as product lifecycle management.

In this example, a process collects answers for a questionnaire that includes questions formulated from data sets in a shared database. The data sets can have a common structure, defined by 1) a subject, e.g., the name of a person, 2) multiple characteristics of the subject, e.g., nationality, gender, religion, etc., 3) a verb, e.g., "likes", "knows", etc., 4) a Boolean indicating whether negation applies, 5) an object, e.g., another person, animal or thing, etc., and 6) a result, e.g., to be filled in by a user.

Initially, the process reads a fixed state of the data sets from the database. The fixed state of the data sets includes data that is not changing during the runtime of the process. For example, the fixed state may include legal information about the questionnaire or a how-to guide providing some examples. At the beginning of each process instance, a variable state of the data sets is read from the database. For example, the variable state may be the questions that are frequently updated by other users of the database.

For each of the data sets, the process in this example composes a question, displays the question on the user interface of a computer, and asks a user to answer the question. Alternatively, the process may provide the data from the data set as input to a function, which produces an output as the answer. This alternative scenario may arise when the user does not know the answer to the question. For example, if the user does not know the person in the question or does not have the requested information about the person, the user can state "I do not know." In response to the user's lack of knowledge about the person, the process can call a pre-determined function, which performs a possibly time- and/or memory-consuming calculation based on the subject characteristics, such as heuristic, statistical estimation, etc.

After the process obtains answers to the questions from the user or from the functions, the answers (also referred to as "results") can be used to update the data sets comprising the questions and the answer (also referred to as "state") by filling in the answers obtained so far. The assignments of answers to questions are then mapped to one or more pre-determined formats. The formatted assignments are buffered as "actions" in an action buffer which all process instances read and write. If a succeeding process instance composes an already answered question again, then it can answer this question internally by applying the corresponding action from the buffer. The process avoids asking the user the same question again, or avoids calling the same time- and/or memory-consuming function again. Using the action buffer, a subsequent process instance can apply the actions built by a predecessor process instance. If the buffered actions answer some of the questions, the user/function only needs to answer the remaining questions. In this example, a final instance can start if its estimated runtime is acceptable as a lock period, e.g., the number of remaining questions can be answered within an allocated time.

Figure 4:
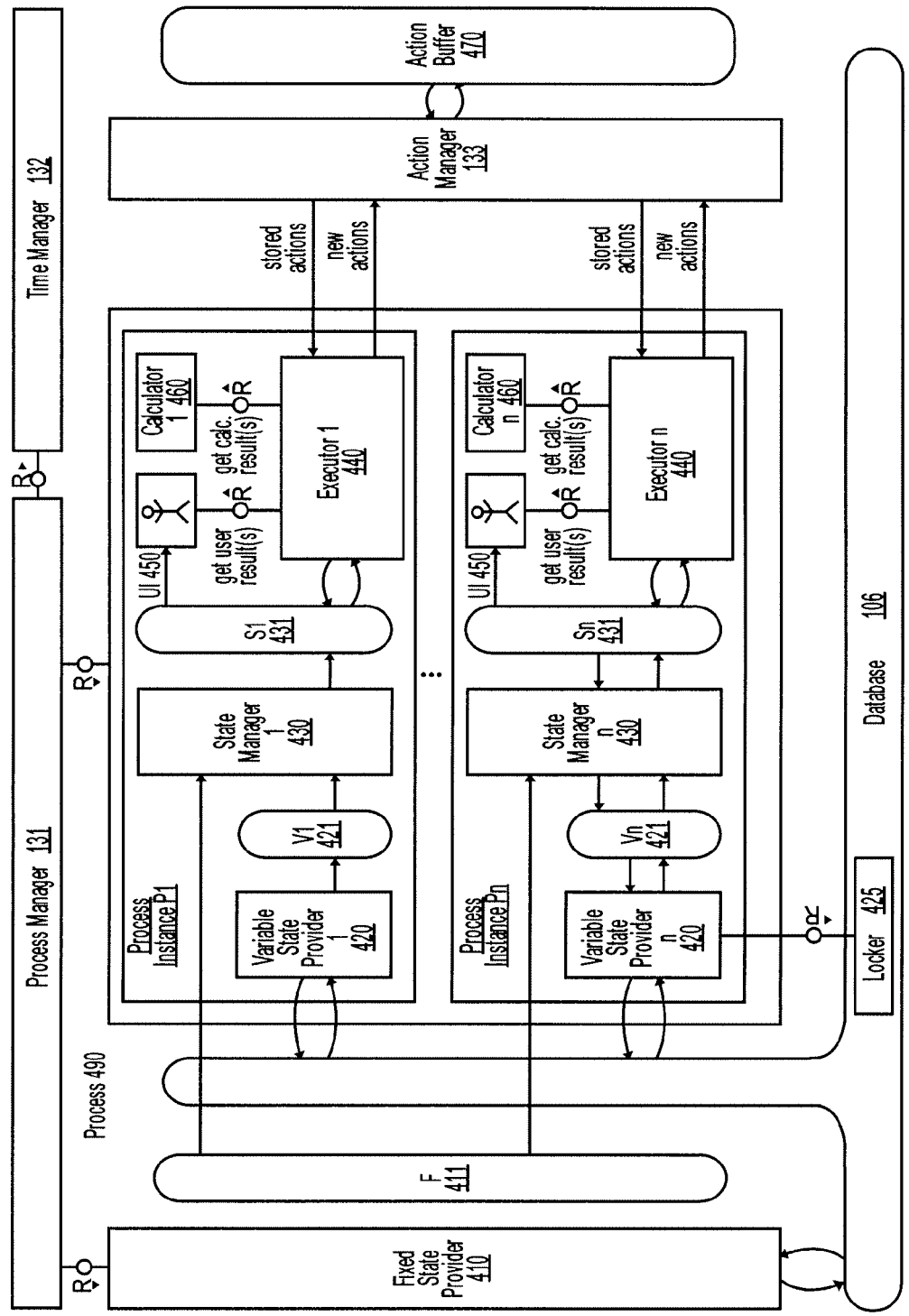
FIG. 4 illustrates a system architecture for implementing a locking mechanism according to one embodiment of the present invention.

FIG. 4 illustrates one embodiment of the components of a system architecture 400 that performs the processes shown in FIGS. 2 and 3. In this embodiment, process manager 131 manages process instances P1-Pn of a process 490. Some of the components in system architecture 400 are actor components (represented by blocks with 90° corners) and some components are data components (represented by blocks with rounded corners). The actor components perform operations, provide data, and compute results. An actor component can request another actor component to perform a pre-determined operation. The request is represented as "R" accompanied by an arrow that indicates the direction in which the request is sent.

In the embodiment of FIG. 4, the fixed portion and the variable portion of shared data are distinguished for performance optimization. However, it is understood that the locking mechanism described herein can reduce the lock period of shared data without the separation of the corresponding state in a fixed and in a variable portion. The fixed portion is the unchangeable state of the shared data, which is read only once from database 106 before the first process instance PI starts and can be used by all process instances P1, . . . , Pn. The fixed portion is represented in FIG. 4 as a fixed state (F) 411 and is provided by a fixed state provider 410. The variable portion of the shared data can be modified by other processes during the runtime of the initial instances of process 490. The variable portion is represented in the figure as variable states (V1, . . . , Vn) 421 and is provided by a variable state provider 420. Each of variable states (V1, . . . , Vn) 421 is read from database 106 at the beginning of a corresponding process instance. Variable states (V1, . . . , Vn−1) 421 are read from database 106 without any lock, and variable state Vn 421 of final process instance Pn is read from database 106 with at least one lock (locker 425).

The actor components in each process instance include variable state provider 420, a state manager 430, an executor 440, a user interface 450 and a calculator 460 (e.g., a function). The data components in each process instance include variable state (V1, . . . , Vn) 421 and combined states (S1, . . . , Sn) 431. State manager 430 combines fixed state (F) 411 with variable state (V1, . . . , Vn) 421 to get combined state (S1, . . . , Sn) 431. The combined state (S1, . . . , Sn) 431 is sent to executor 440, which applies actions retrieved from an action buffer 470 to change combined state (S1, . . . , Sn) 431 of the current process instance.

Executor 440 in each process instance retrieves stored actions (also referred to as "old actions") from action buffer 470 via action manager 133. Action manager 133 manages action buffer 470, which is a memory buffer shared by all of process instances P1, . . . , Pn. In one embodiment, action buffer 470 stores at least those actions which were built using results obtained from the user or results of function calls which consumed considerable system resources (e.g. runtime, memory). During each process instance, action manager 133 retrieves buffered actions which are relevant for combined state 431 of the current process instance. Executor 440 applies as many of these buffered actions as possible. The applicability of a buffered action depends on characteristics of combined state 431, and these characteristics may have been changed by another business process after the action is stored in action buffer 470. Therefore, some of the actions which were buffered by preceding process instances may be inapplicable to the current process instance. However, if most buffered actions are applicable to the current process instance, then the current process instance will quickly reach the same or an equivalent state, which its preceding process instance was able to reach only after extensive user interactions or time and memory intensive computations.

After applying the buffered actions to combined state 431, process 490 starts a loop during which executor 440 requests from a user to enter one or multiple decisions/answers or triggers one or more computation functions. The user inputs are received via user interface 450 and the computation functions are performed by calculator 460. Results of the user inputs and computations are referred to as "user results" and "calculator results," respectively. Executor 440 then updates combined state (S1, . . . , Sn) 431 based on the user results or calculator results. Executor 440 may format the user results or the calculator results into actions (also referred to as "new actions") and send them to action manager 133 for storage in action buffer 470. This way, a succeeding instance can more easily perform the necessary updates of the combined state (S1, . . . , Sn) 431. Each process instance can leave this loop after any number of runs. In general, the process instance leaves the loop when it does not need to perform further manipulations on the shared data.

Each process instance (P1, . . . , Pn) is controlled by process manager 131. Process manager 131 initiates process 490 and signals fixed state provider 410 to provide fixed state (F) 411 at the beginning of process 490. Process manager 131 also starts a next process instance, and in some scenarios, terminates a process instance. Process manager 131 communicates with time manager 132, which determines whether the next process instance is to be final, for instance, by estimating the runtime of the next instance. If time manager 132 decides that the estimated runtime of the next instance is acceptable within the given time and resource constraints, time manager 132 notifies process manager 131 to start final process instance Pn that acquires at least one lock (locker 425) when reading variable state Vn from database 106. Time manager 132 can estimate the runtime of a next instance based on the number of remaining user decisions to be obtained, the number of remaining function calls to be made, or other indicators.

Figure 5:
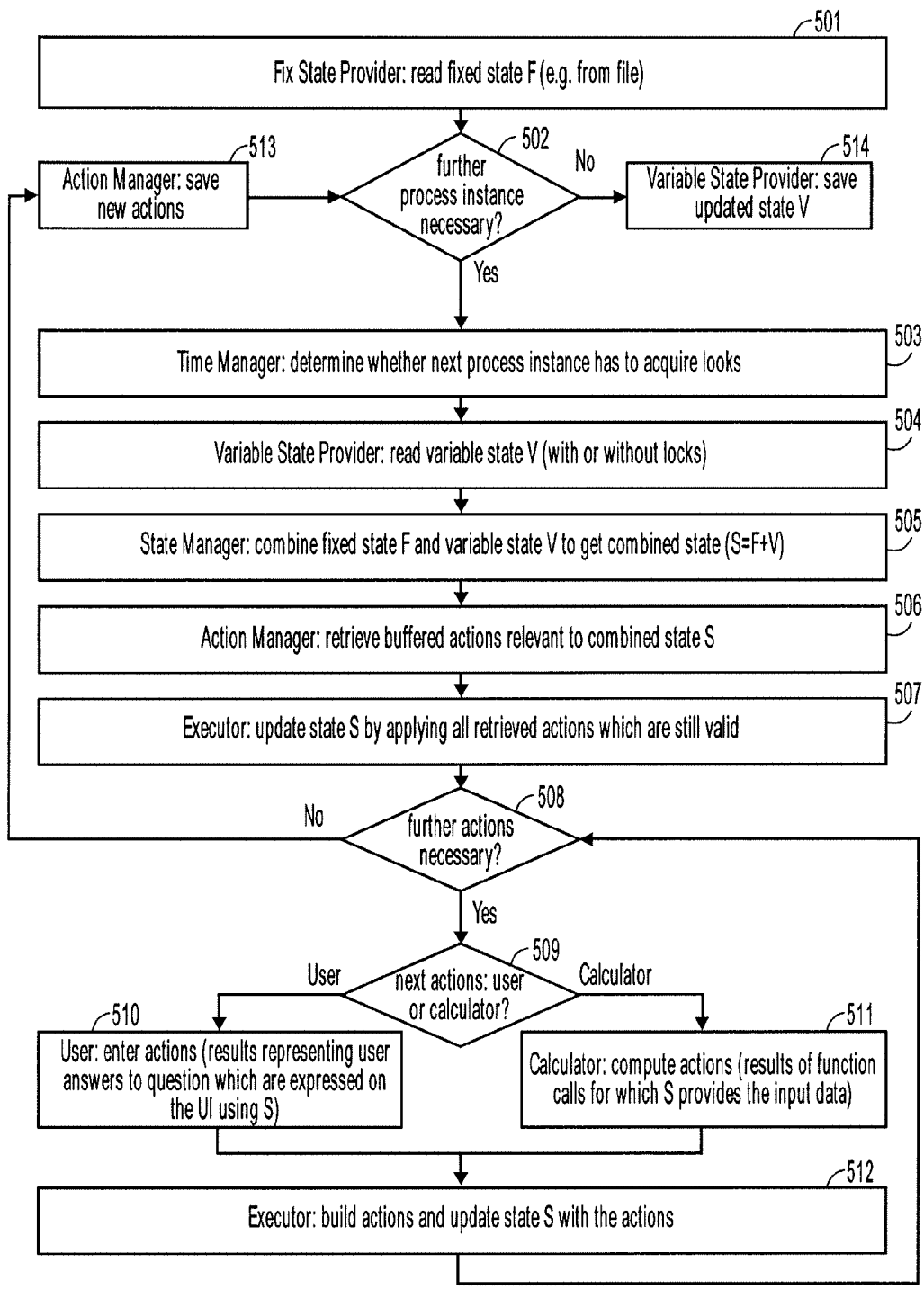
FIG. 5 illustrates a flow diagram of a process that uses the locking mechanism according to one embodiment of the present invention.

FIG. 5 illustrates a flow diagram of a process 500 for implementing an ultimate locking mechanism according to one embodiment of the present invention. Process 500 may be performed by processing logic that may comprise hardware (e.g., circuitry, dedicated logic, programmable logic, microcode, etc.), software (such as instructions stored on a computer-readable medium executable by a processing system), or a combination thereof. In one embodiment, process 500 is performed by the components of system architecture 400 shown in FIG. 4.

Referring to FIG. 5, process 500 starts with a pre-processing stage. In the pre-processing stage, fixed state provider 410 reads fixed state (F) 411 from database 106, e.g., from a file (block 501). Process 500 then proceeds to skip block 502 and 503 during this first iteration (of the ultimate locking mechanism described herein). This is because process 500 has to start at least one initial process instance, which prepares for the final instance and does not acquire any locks, in order to minimize the lock period of process 500. From the second iteration on process 500 determines whether further process instances are necessary to obtain the final results of process 500 (block 502). If further process instances are necessary, time manager 132 determines whether the next instance is the final instance that acquires locks on the data sets (block 503). If no further process instances are necessary, process 500 proceeds to save updated variable state (V) 421 into database 106 (block 514).

At the beginning of a process instance, variable state provider 420 reads the variable state (V) 421 of shared data from database 106 (block 504). The variable state (V) 421 is read with locks if and only if the instance is the final instance. State manager 430 combines the variable state (V) 421 with the fixed state (F) 411 to get the combined state (S) 431 (block 505). At this point, action manager 133 retrieves buffered actions that are relevant to the combined state (S) 431 from action buffer 470 (block 506). Action manager 133 sends the retrieved actions to executor 440. Executor 440 then updates the combined state (S) 431 by applying the retrieved actions that are still valid (block 507).

Process 500 then proceeds to determine whether further actions are necessary (block 508). If further actions are necessary, then process manager 131 determines whether the next actions should be performed by a user or a calculator (block 509). If the next actions are to be performed by a user, user interface 450 displays questions or other information to the user using the combined state (S) 431 (block 510), to solicit answers or decisions from the user. If the next actions are to be performed by calculator 460, the combined state (S) 431 is used as the input to calculator 460 (block 511). Calculator 460 may be a function or may call a function that runs an algorithm to produce an output. Based on the user answers or calculator output, executor 440 builds actions of one or more pre-defined formats with which it updates the combined state (S) 431 (block 512). Process 500 then returns to block 508 to determine whether further actions are necessary.

If, at block 508, no further actions are necessary, then process 500 proceeds to block 513 where action manager 133 buffers a subset of the newly built actions. Each instance of process 500 accumulates the built actions and requests from the action manager 133 only once to buffer new actions. In another embodiment, executor 440 sends newly built actions to the action manager 133 before the necessity for further actions is checked again (block 508). In any case, process 500 subsequently returns to block 502 to determine whether further process instances are necessary. If no process instances are necessary, variable state provider 420 saves the updated variable state (V) 421 into database 106 (block 514) and releases all acquired locks.

An embodiment of the invention may be a machine-readable medium having stored thereon instructions which cause a programmable processor to perform operations as described above. In other embodiments, the operations might be performed by specific hardware components that contain hard-wired logic. Those operations might alternatively be performed by any combination of programmed computer components and custom hardware components.

A machine-readable medium may include any mechanism for storing information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that the ultimate locking mechanism can also be made by software and hardware that distribute the functions of embodiments of this invention differently than herein described. Such variations and implementations are understood to be made without departing from the broader spirit and scope of the invention as set forth in the following claims. The specification and drawings are, accordingly, to be regarded in an illustrative sense rather than a restrictive sense.

What is claimed is:

1. A computer-implemented method for minimizing a lock period to modify shared data in a shared database, the method comprising:

executing one or more initial instances of a process without acquiring a lock on the shared database, the process comprising a plurality of instances with each instance being one of the initial instances or a final instance, each initial instance reading the shared data and generating a result that is at least partially stored in a buffer;

determining that a next instance is the final instance of the process based on an estimated runtime of the next instance by determining whether the estimated runtime is acceptable as the lock period for modifying the shared data; and executing the final instance by using buffered results during execution and acquiring the lock on the shared database to modify the shared data.

2. The method of claim 1, further comprising:

building, by each instance, a state of the shared data when reading the shared data from the shared database;

repeatedly updating, by each instance, the state of the shared data; and storing, by the final instance, an updated state of the shared data in the shared database to modify the shared data.

3. The method of claim 2, wherein the state includes a fixed portion and a variable portion, the method further comprising:

reading only once the fixed portion of the state from the shared database before a first instance of the process is executed; and reading the variable portion of the state from the shared database at the beginning of each instance of the process.

4. The method of claim 2, wherein obtaining results further comprises:

providing the state as an input to a function or a user interface;

building one or more actions that have one or more formats with an output of the function or the user interface, wherein the results include the output; and buffering at least some of the built actions in an action buffer shared by the initial instances and the final instance.

5. The method of the claim 4, wherein repeatedly updating the state further comprises:

changing the state of the shared data in a current instance by applying an action built from the obtained results.

6. The method of the claim 4, wherein repeatedly updating the state further comprises:

changing the state of the shared data in a current instance by applying an action which has been built by another instance and which was retrieved from the action buffer.

7. The method of claim 1, further comprising:

starting one of the instances before another one of the instances finishes.

8. The method of claim 1, further comprising:

starting a current instance of the process after a preceding instance finishes.

9. A system for minimizing a lock period to modify shared data in a shared database, the system comprising:

data storage to store a database shared by a plurality of processes; and a server coupled to the data storage, the server comprising:

a process manager to execute one or more initial instances of a process without acquiring a lock on the database, the process comprising a plurality of instances with each instance being one of the initial instances or a final instance, each initial instance to read the shared data and to generate results;

a buffer to buffer the results at least partially; and a time manager to determine whether a next instance is the final instance of the process based on an estimated runtime of the next instance by determining whether the estimated runtime is acceptable as the lock period for modifying the shared data, wherein the process manager is to execute the final instance by using at least one of the buffered results during execution and acquiring the lock on the shared database to modify the shared data.

10. The system of claim 9, further comprising:

a state manager to build a state of the shared data, the state manager to combine a fixed portion of the state with a variable portion of the state, wherein the fixed portion is read only once from the database before a first instance of the process is executed and the variable portion is read from the database at the beginning of each instance of the process.

11. The system of claim 9, wherein the buffer is shared by all of the instances.

12. The system of claim 11, further comprising:

an action manager that retrieves, from the buffer, an action which has been built by another instance with the results, and to forward the action to an executor to change the state of the shared data in a current instance.

13. The system of claim 9, wherein the process manager starts one of the instances before another one of the instances finishes.

14. The system of claim 9, wherein the process manager starts a current instance of the process after a preceding instance finishes.

15. A non-transitory computer-readable storage medium including instructions that, when executed by a processing system, cause the processing system to perform a method for minimizing a lock period to modify shared data in a shared database, the method comprising:

executing one or more initial instances of a process without acquiring a lock on the shared database, the process comprising a plurality of instances with each instance being one of the initial instances or a final instance, each initial instance, each initial instance reading the shared data and generating a result that is at least partially stored in a buffer;

determining that the next instance is the final instance of the process based on an estimated runtime of the next instance by determining whether the estimated runtime is acceptable as the lock period for modifying the shared data; and executing the final instance by using buffered results during execution and acquiring the lock on the shared database to modify the shared data.

16. The non-transitory computer-readable storage medium of claim 15, wherein the method further comprises:

building, by each instance, a state of the shared data when reading the shared data from the shared database;

repeatedly updating, by each instance, the state of the shared data; and storing, by the final instance, an updated state of the shared data in the shared database to modify the shared data.

17. The non-transitory computer-readable storage medium of claim 16, wherein the state includes a fixed portion and a variable portion, the method further comprising:

reading only once the fixed portion of the state from the shared database before a first instance of the process is executed; and reading the variable portion of the state from the shared database at the beginning of each instance of the process.

18. The non-transitory computer-readable storage medium of claim 16, wherein obtaining results further comprises:

providing the state as an input to a function or a user interface;

building one or more actions that have one or more formats with an output of the function or the user interface, wherein the results include the output; and buffering at least some of the built actions in an action buffer shared by the initial instances and the final instance.

19. The non-transitory computer-readable storage medium of claim 18, wherein repeatedly updating the state further comprises:

changing the state of the shared data in a current instance by applying an action built from the obtained results.

20. The non-transitory computer-readable storage medium of claim 18, wherein repeatedly updating the state further comprises:

changing the state of the shared data in a current instance by applying an action which has been built by another instance and which was retrieved from the action buffer.

* * * * *